US009317285B2

(12) United States Patent
Gupta et al.

(10) Patent No.: US 9,317,285 B2
(45) Date of Patent: Apr. 19, 2016

(54) INSTRUCTION SET ARCHITECTURE MODE DEPENDENT SUB-SIZE ACCESS OF REGISTER WITH ASSOCIATED STATUS INDICATION

(75) Inventors: Sandeep Gupta, Santa Clara, CA (US); Conrado Blasco-Allue, Sunnyvale, CA (US); John H. Mylius, Gilroy, CA (US); Gerard R. Williams, III, Los Altos, CA (US); James B. Keller, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1024 days.

(21) Appl. No.: 13/460,178

(22) Filed: Apr. 30, 2012

(65) Prior Publication Data

US 2013/0290681 A1     Oct. 31, 2013

(51) Int. Cl.
*G06F 9/34* (2006.01)
*G06F 9/30* (2006.01)
*G06F 9/38* (2006.01)
*G06F 1/32* (2006.01)

(52) U.S. Cl.
CPC ........ *G06F 9/30141* (2013.01); *G06F 9/30112* (2013.01); *G06F 9/384* (2013.01); *G06F 1/3234* (2013.01)

(58) Field of Classification Search
CPC ............ G06F 9/30145; G06F 9/30014; G06F 9/30112; G06F 9/3016; G06F 9/3824; G06F 9/34; G06F 9/30185; G06F 9/30098; G06F 9/30189
See application file for complete search history.

(56) References Cited

U.S. PATENT DOCUMENTS

| 5,673,426 | A | 9/1997 | Shen et al. | |
|---|---|---|---|---|
| 6,253,314 | B1 * | 6/2001 | Itoh | 712/226 |
| 6,266,755 | B1 | 7/2001 | Yeager | |
| 6,393,546 | B1 | 5/2002 | Witt et al. | |
| 6,560,694 | B1 | 5/2003 | McGrath et al. | |
| 6,802,017 | B1 * | 10/2004 | Takayama et al. | 713/324 |
| 6,889,312 | B1 | 5/2005 | McGrath et al. | |
| 8,914,619 | B2 * | 12/2014 | Greiner et al. | 712/220 |
| 2008/0016326 | A1 | 1/2008 | Svendsen et al. | |
| 2008/0077773 | A1 | 3/2008 | Julier et al. | |
| 2011/0231633 | A1 | 9/2011 | Grisenthwaite et al. | |
| 2012/0151189 | A1 * | 6/2012 | Kruecken | 712/220 |

OTHER PUBLICATIONS

U.S. Appl. No. 14/076,660, Conrado Blasco, filed Nov. 11, 2013.
"ARMv8 Instruction Set Overview: Architecture Group", ARM Limited, Nov. 11, 2011, 112 pages, Document No. PRD03-GENC-010197 15.0.

* cited by examiner

*Primary Examiner* — Kenneth Kim
(74) *Attorney, Agent, or Firm* — Rory D. Rankin; Meyertons, Hood, Kivlin, Kowert & Goetzel, P.C.

(57) ABSTRACT

A system and method for efficiently reducing the power consumption of register file accesses. A processor is operable to execute instructions with two or more data types, each with an associated size and alignment. Data operands for a first data type use operand sizes equal to an entire width of a physical register within a physical register file. Data operands for a second data type use operand sizes less than an entire width of a physical register. Accesses of the physical register file for operands associated with a non-full-width data type do not access a full width of the physical registers. A given numerical value may be bypassed for the portion of the physical register that is not accessed.

19 Claims, 5 Drawing Sheets

INSTRUCTION SET ARCHITECTURE MODE DEPENDENT SUB-SIZE ACCESS OF REGISTER WITH ASSOCIATED STATUS INDICATION

BACKGROUND OF THE INVENTION

1. Field of the Invention

This invention relates to microprocessors, and more particularly, to efficiently reducing the power consumption of register file accesses.

2. Description of the Relevant Art

As time passes, more and more functionality is provided within a given area of on-die real estate of semiconductor processor cores. As a result, mobile devices, such as laptop computers, tablet computers, smart phones, video cameras, and the like, have increasing popularity. Vital issues for these mobile devices include power consumption and battery life.

In semiconductor devices, an appreciable amount of power may be consumed by accesses to a register file that is used to store data values during processing. Generally speaking, an architectural register file increases in size as a processor microarchitecture supports a larger programming data model. One example is a transition from a 32-bit microarchitecture to a 64-bit microarchitecture. The architectural register file may double in width for this design transition. Additionally, various applications may exceed the address space limitations of a 32-bit microarchitecture, which causes the transition to an even larger programming data model. These various applications may include at least database applications, Web search engines, simulation and modeling tools, scientific computing, and so forth.

In addition to the above, a given operating system may support a particular programming data model that determines data type sizes and alignment. For example, integers, long integers, and pointers are some data types with different sizes based on a given programming data model. Therefore, one or more data types may not utilize an entire width of a general-purpose register for an associated data operand. For example, each integer in a 64-bit programming data model may have a data type size of 32 bits. In such an embodiment, only one half of a general-purpose register is needed to store a 32-bit value for the integer data operand. The remaining half of the register remains unused. In some cases, the unused portion of the register may be filled with zeroes. While only a portion of the register is being used to store the data, read and write accesses to the register may continue to access the entire register. Consequently, power consumption may be greater than in necessary.

Another occurrence of the usage of different sized data types is the usage of instruction set extensions. In one example, an embedded processor utilizes an Advanced RISC Machines (ARM) instruction set. In addition, this processor may utilize a Thumb instruction set extension. Thumb instructions may use smaller sized data operands than the ARM instructions. Similar to the above, in cases where a data operand does not have a size matching a full width of a register, read and write operations of the full width of the register may still be performed. For example, when an instruction is a producer for the data operand, a portion of the register may be written with a predetermined value, such as zero. When the instruction is a consumer for the data operand, the full width of the register may still be read. These register file accesses consume power while being unnecessary to perform.

In view of the above, efficient methods and mechanisms for efficiently reducing the power consumption of register file accesses are desired.

SUMMARY OF EMBODIMENTS OF THE INVENTION

Systems and methods for efficiently reducing the power consumption of register file accesses.

In one embodiment, a processor includes multiple physical registers within a register file. The processor additionally includes a register rename unit. The processor may further be configured to process instructions with two or more data types, each with an associated size and alignment. Data operands for a first data type may use operands sizes equal to a full width of a physical register within the register file, while data operands for a second data type may use operand sizes less than the full width of a physical register. The register rename unit may assign a given rename register identifier to a destination operand of an instruction. In response to detecting the instruction is associated with the second data type, the register rename unit may store an indication indicating that a portion of the physical register identified by the given rename register identifier is not accessible.

In various embodiments, when the physical register file receives accesses for data operands associated with the non-full-width data type, the full width of physical registers may not be accessed for read and write operations. Additionally, when the physical register file receives a read operation for an instruction associated with a full width data type and the source operand was updated by an instruction associated with the non-full-width data type, the full width of a physical register associated with the source operands is not accessed. In some embodiments, the physical register file may forward a given numerical value for the portion of the physical register that is not accessed. In one embodiment, the numerical value is zero.

These and other embodiments will be further appreciated upon reference to the following description and drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 1:
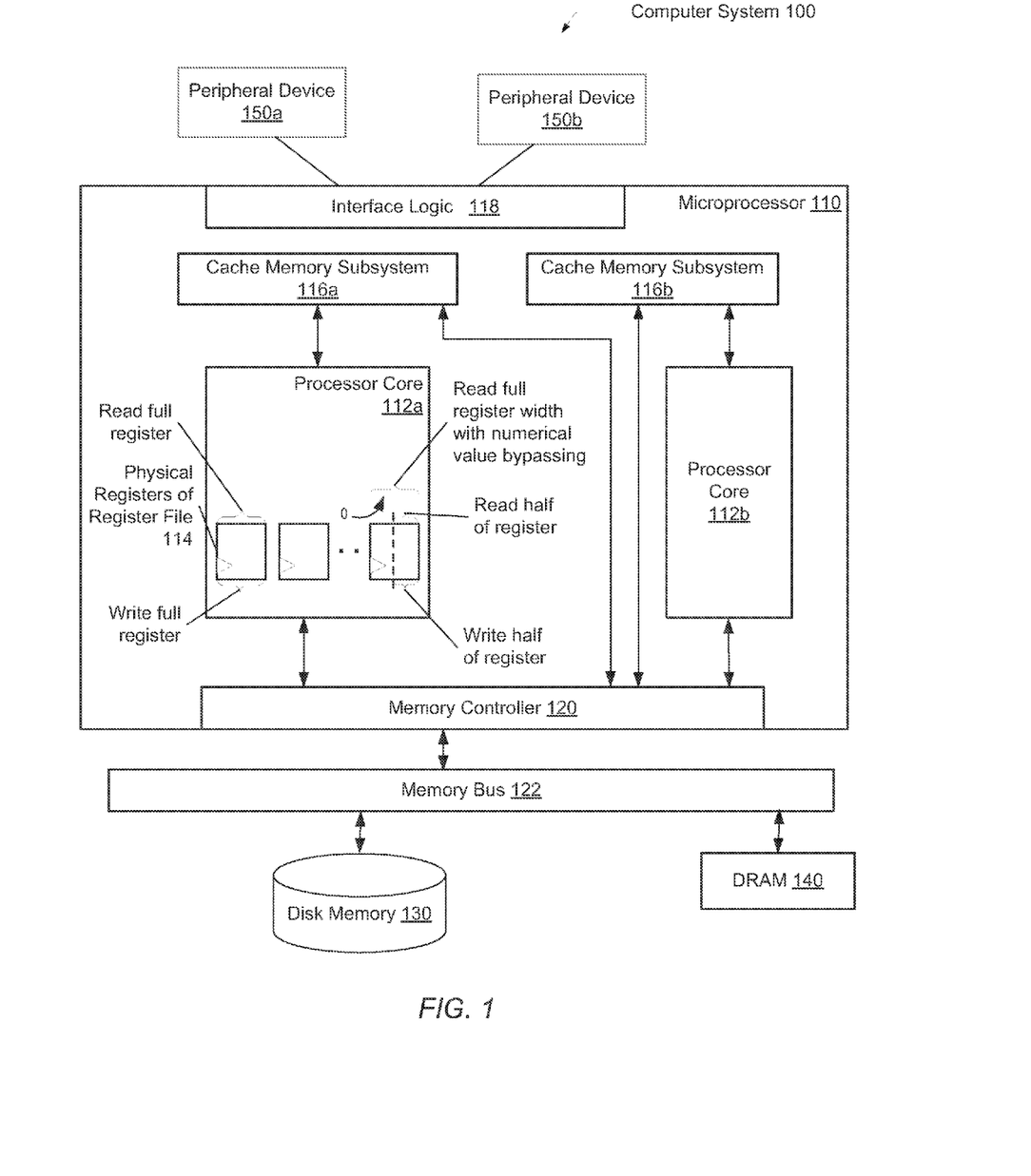
FIG. 1 is a generalized block diagram of one embodiment of a computer system.

Referring to FIG. 1, a generalized block diagram of one embodiment of a computer system 100 is shown. As shown, microprocessor 110 may be connected to one or more peripheral devices 150a-150b, and external computer memory, such as disk memory 130 and dynamic random access memory (DRAM) 140. The disk memory 130 may store an operating system (OS) for the computer system 100.

Instructions of a software application may be stored in one or more of the disk memory 130, the DRAM 140 and one of the peripheral devices 150a-150b. The software application may be loaded into one or more of the cache memory subsystems 116a-116b within the microprocessor 110. In one embodiment, the software application includes instructions with two or more data types, each with an associated size and alignment. In one embodiment, each instruction includes a bit to indicate whether the instruction is associated with a data type size less than a width of a physical register within a physical register file. In one embodiment, an ISA may support 64-bit data operands. However, many data types may have a size of 32 bits. For example, integers, long integers, and pointers are some data types with different sizes. In some cases, an entire upper half of the register file may be turned on for accesses and consume power even though only lower half includes desired data. In another embodiment, the ISA may support extension instructions associated with a data type size less than a width of a physical register within the register file. For example, the ARM ISA supports the Thumb extension instructions. In one example, the ARM instruction set includes 32-bit instructions. The Thumb instruction set includes 16-bit instructions. A mode set by code within a program may determine whether Thumb instructions are being processed.

In some embodiments, a software programmer may use code directives within the application to assist an assembler tool to detect different instruction set modes. In addition, instructions in the code may set and reset a particular bit position of a return address to switch between the instruction sets. A link register may store a return address after a call. A least-significant bit of this link register may indicate which instruction set to switch to when returning. In one embodiment, a set bit in the least-significant bit positions may indicate a Thumb instruction set and a reset bit may indicate an ARM instruction set.

One or more of the processor cores 112a-112b may load the software application instructions from an associated one of the cache memory subsystems 116a-116b and process the instructions. Generally speaking, when software programmers write applications to perform work according to an algorithm or a method, the operating system allocates regions of memory for the software application.

During processing of the application, the data may be loaded from the allocated regions of memory into one or more of the cache memory subsystems 116a-116b. Subsequently, one or more of the physical registers included in the physical register file 114 within the processor cores 112a-112b are used to load and store the temporary and result data. A subset of the physical registers in the physical register file (RF) 114 includes architecturally visible registers that a software programmer and/or a compiler may identify within the software application. The architectural registers are associated with a given instruction set architecture (ISA).

The hardware in the processor cores 112a-112b includes circuitry for processing instructions according to the given ISA(s). The hardware circuitry includes at least a physical RF 114, functional units, pipeline staging elements and control logic. The ARM instruction set architecture may be selected for the given ISA. Alternatively, the Thumb, Alpha, PowerPC, SPARC, MIPS, x86, or any other ISA may be selected.

A given ISA may be used to select a manner for declaring and allocating regions of memory. The given ISA may further determine a selected addressing mode used to transfer data between the microprocessor 110, including the physical RF 114, and memory locations in one or more of the disk memory 130, the DRAM 140 and the peripheral devices 150a-150b. An amount of a width of a targeted physical register to access may depend on a data type associated with a given instruction. In response to the physical RF 114 receives an access request, a fraction of an entire width or the entire width of the targeted physical registers may be accessed based on the data type. The access may correspond to a read operation for a source operand or a write operation for a destination operand. The left-most physical register in the physical RF 114 generally illustrates accesses of the entire width of a given physical register. For a 64-bit physical RF 114, when each of an instruction and a physical register corresponding to a data operand are associated with a 64-bit data type, the entire 64 bits of the targeted physical register may be accessed during read and write operations.

In one example, when the processor 112a is processing an instruction with an operand size less than the entire width of a physical register, again, an entire width of the targeted physical register may be accessed. In this case, only a portion of the entire width may be targeted for an update. For example, the least-significant half of the width may be associated with the second instruction set. However, the most-significant half of the width may be padded with a given numerical value, such as zero. During a write operation for a destination operand, the most significant half of the targeted physical register may be written with the value zero. During a later read operation for a source operand, the most-significant half of the targeted physical register storing the value zero may be read along with the least-significant half of the targeted physical register storing the source operand value. For a 64-bit physical RF 114, the entire 64 bits of the targeted physical register may be accessed during read and write operations although the operands have a size of 32 bits, or half of the targeted physical register. During a write operation, the lower 32 bits may be updated with write data while the upper 32 bits are updated with the value zero. During a read operation, the entire 64 bits may be read out, although the upper 32 bits merely store the value zero.

In another example, when the processor 112a is processing an instruction with an operand size less than the entire width of a physical register, only a portion of the entire width of the targeted physical register may be accessed. For example, the least-significant half of the width of the targeted physical register may be associated with an operand data type size. During a write operation for a destination operand, the least significant half of the targeted physical register may be updated with write data. Additionally, the most-significant half of the targeted physical register may be prevented from being accessed. During a read operation for a source operand, the least-significant half of the targeted physical register may be read out. Again, the most-significant half of the targeted physical register may be prevented from being accessed. For a 64-bit physical RF 114, the least-significant 32 bits of the targeted physical register may be accessed during read and write operations. In contrast, the most-significant 32 bits may be prevented from being accessed. Therefore, the physical RF 114 may consume less power due to the reduced widths of accesses. The right-most physical register in the physical RF 114 generally illustrates accesses of a portion of the entire width of a targeted physical register when the processor 112a is in the second instruction set mode.

In yet another example, the processor 112a may be processing an instruction with an operand size less than the entire width of a physical register. The targeted physical register in the physical RF 114 may be updated by a write operation. Again, in this example, the least-significant 32 bits of the targeted physical register may be updated with write data while the most-significant 32 bits is not accessed. Later, the processor 112a may be processing an instruction with an operand size equal to the entire width of a physical register. During a read operation, the same targeted physical register may now be used as a source operand. An indication may be stored to indicate this targeted physical register still holds a valid value that was previously written with an operand size less than the entire width of a physical register.

Continuing with the above example, the least-significant 32 bits of the targeted physical register may be read out. Although the processor 112a may be currently processing an instruction with an operand size equal to the entire width of a physical register, the most-significant 32 bits of the targeted physical register may not be accessed in response to detecting the source operand is associated with a data type size less than the full width of a physical register. Rather, bypass logic within the physical RF 114 may convey a given numerical value to represent the most-significant 32 bits. For example, a single bit with a numerical value of zero may be read out. This single bit may be expanded to 32 bits to be stored in read data flip-flops or other storage elements. Alternatively, the stored indication may be used to load a zero in the most-significant 32 bits of the read data storage elements. The right-most physical register in the physical RF 114 generally illustrates accesses of a portion of the entire width of a targeted physical register when the processor 112a alternates between data type sizes. Again, the physical RF 114 may consume less power due to the reduced widths of the accesses.

The above examples may be summarized, such as in the below table. Table 1 summarizes register file access behavior for an example where a full width of an associated physical register within a physical register file is 64 bits. In addition, a full width of a datapath is 64 bits. In this example, a non-full-width read or write register file request accesses a least-significant 32 bits (or lower 32 bits) of the 64 bit full width. Other data type sizes and accessible portions of the full width are possible and contemplated.

TABLE 1

Behavior for full-with and non-full-width register file access.

| | Producer Width (bits) | Consumer Width (bits) | Register File (RF) Access Behavior |
| --- | --- | --- | --- |
| Case 1 | 32 | 32 | For the upper 32 bits of each of the Producer and the Consumer, shut off the read and write RF accesses and the datapath activity. |
| Case 2 | 64 | 32 | For the upper 32 bits of only the Consumer, shut off the read RF accesses and the datapath activity. |
| Case 3 | 32 | 64 | For the upper 32 bits of the Producer, shut off the write RF accesses and the datapath activity. For the upper 32 bits of the Consumer, shut off the read RF accesses. Without reading the RF, provide zeroes on the upper 32 bits to the Consumer. |
| Case 4 | 64 | 64 | There are no shut-offs. |

Table 1 summarizes steps taken in order to reduce power consumption. A producer is an instruction that generates a result to be written to a given physical register within the physical register file. The given physical register may be identified by a destination operand in the producer. A consumer is an instruction that uses data read from the given physical register within the physical register file. The given physical register may be identified by a source operand in the consumer. Before continuing with further details regarding reducing the power consumption of register file accesses, a further description of the components in the computer system 100 is provided.

In addition to including processor cores 112a-112b connected to corresponding cache memory subsystems 116a-116b, the microprocessor 110 may also include interface logic 118, and a memory controller 120. Other logic and inter- and intra-block communication is not shown for ease of illustration. The illustrated functionality of the microprocessor 110 may be incorporated upon a single integrated circuit. In another embodiment, the illustrated functionality is incorporated in a chipset on a computer motherboard. In some embodiments, the microprocessor 110 may be included in a desktop or a server. In yet another embodiment, the illustrated functionality is incorporated in a semiconductor die on a system-on-a-chip (SOC).

Each of the processor cores 112a-112b may include circuitry for executing instructions according to a given ISA. In one embodiment, each of the processor cores 112a-112b may include a superscalar, multi-threaded microarchitecture used for processing instructions of a given ISA. Although multiple general-purpose processor cores are shown in the microprocessor 110, in various other embodiments, the microprocessor 110 may include one or more other specific cores, such as a digital signal processor (DSP), a graphics processing unit (GPU), an application specific integrated circuit (ASIC), and so forth.

In addition to out-of-order issue of instructions to execution units within a superscalar microarchitecture, each of the processor cores 112a-112b may perform register renaming to increase throughput. Each of the processor cores 112a-112b may include a set of physical registers in the physical RF 114 larger than a set of integer and floating-point architecturally visible registers. Using hardware, each of the processor cores 112a-112b dynamically renames an architectural register identifier used for a source operand. Similarly, the hardware dynamically renames an architectural register identifier used for a destination operand. The renaming may occur after instruction decode. When a source operand is renamed, a previously used physical register number may be mapped to the source operand if that mapping is still valid. Otherwise, a new physical register number from a free list may be mapped to the source operand. When a destination operand is renamed, a new physical register number from the free list is used. When an instruction commits, a physical register storing the instruction destination value becomes a candidate to return to the free list.

When the hardware renames an architectural register identifier with a physical register identifier, the hardware stores the mapping in a data structure, such as a mapping table. As used herein, an identifier for either an architectural register or a physical register may also be referred to as a number. Therefore, an architectural register identifier may also be referred to as an architectural register number. Similarly, a physical register identifier may be referred to as a physical register number. The physical register number used to rename an architectural register number may also be referred to as a rename register number or rename register identifier.

Each of the cache memory subsystems 116a-116b may reduce memory latencies for a respective one of the processor cores 112a-112b. In addition, one or more shared cache memory subsystems may be used. A reduced miss rate achieved by the additional memory provided by the cache memory subsystems 116a-116b helps hide the latency gap between a given one of the processor cores 112a-112b and the off-chip memory.

If a cache miss occurs, such as a requested block is not found in a respective one of the cache memory subsystems 116a-116b, then a read request may be generated and transmitted to the memory controller 120. The memory controller 120 may translate an address corresponding to the requested block and send a read request to the off-chip DRAM 140 through the memory bus 122. The memory controller 120 may include control circuitry for interfacing to the memory channels and following a corresponding protocol. Additionally, the memory controller 120 may include request queues for queuing memory requests. The off-chip DRAM 170 may be filled with data from the off-chip disk memory 130.

The off-chip disk memory 130 may provide a non-volatile, random access secondary storage of data. In one embodiment, the off-chip disk memory 130 may include one or more hard disk drives (HDDs). In another embodiment, the off-chip disk memory 130 utilizes a Solid-State Disk (SSD).

The off-chip DRAM 140 may be a type of dynamic random-access memory that stores each bit of data in a separate capacitor within an integrated circuit. Unlike HDDs and flash memory, the DRAM 140 may be volatile memory, rather than non-volatile memory. The off-chip DRAM 140 may include a multi-channel memory architecture. This type of architecture may increase the transfer speed of data to the memory controller 130 by adding more channels of communication between them.

Although only two peripheral devices are shown in the computer system 100 for illustrative purposes, another number of peripheral devices may be connected to the microprocessor 110. One or more of the peripheral devices 150a-150b may be a display including a modern TV or a computer monitor. A video graphics subsystem may be used between the display and the microprocessor 110. One or more of the peripheral devices 150a-150b may one of a typically utilized input/output device such as a keyboard, mouse, printer, modem, and so forth.

Figure 2:
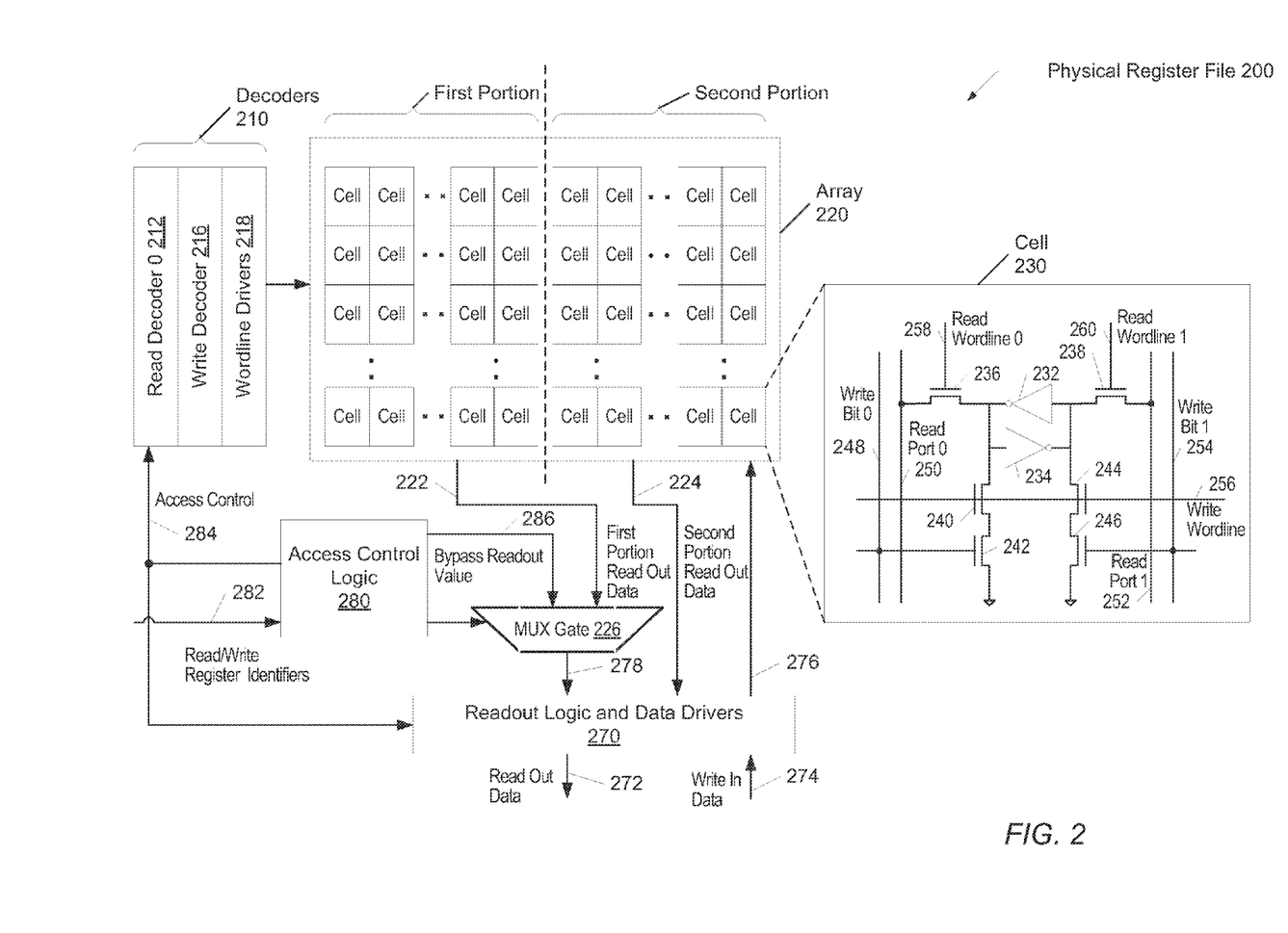
FIG. 2 is a generalized block diagram illustrating one embodiment of a physical register file.

Turning now to FIG. 2, a generalized block diagram of one embodiment of a physical register file 200 is shown. As shown, the physical register file 200 includes an array 220, multiple decoders 210, readout logic and data drivers 270, and access control logic 280. The array 220 includes multiple cells, wherein each cell 230 may store a bit of information for an associated register. The information may include status information and data corresponding to an operand. Regarding the microarchitecture of a processor, the physical register file 200 is a large pool of registers. As described earlier, a portion of these registers are architectural registers visible to a software programmer and a compiler. The remaining registers may be non-architectural registers used during the register renaming process.

As can be seen in FIG. 2, the physical register file 200 contains much circuitry. An access of the physical register file 200 may consume an appreciable amount of power. In addition, the access may include an appreciable delay before receiving an associated output or response. However, for certain read and write operations, the access control logic 280 may prevent access of an appreciable portion of the array 220. Therefore, an appreciable amount of circuitry within the decoders 210, the wordline drivers 218, the array 220, and the read out logic and data drivers 270 may not be used during a given read or write operation.

During operation, the physical register file 200 may receive a read or a write register identifier 282. The read register identifier 282 may be a rename register number (physical register number) for a source operand of a read operation or a destination operand for a write operation. The decoders 210 and the wordline drivers 218 may receive control signals (not shown) that indicate whether an access is for a read operation or a write operation. Additionally, the decoders 210 and the wordline drivers 218 may receive the register identifier via the access control logic 280. Alternatively, the decoders 210 and the wordline drivers 218 may directly receive the register identifier. However, the access control logic 280 may send control signals to the decoders 210 and the wordline drivers 218 determining whether this circuitry produces valid output to send to the array 220. For example, if the access control logic 280 determines a read or a write register identifier on line 282 corresponds to an access that does not utilize an entire width of a physical register, then the logic 280 may prevent some of the circuitry within the components 210-270 from being used for an access of a portion of an associated physical register.

In one example, the access control logic 280 may receive on line 282 a write register identifier identifying a particular physical register in the array 220. This particular physical register may be a destination operand for an instruction with an operand size less than the entire width of a physical register. For example, this particular physical register may be a destination operand for a 32-bit instruction in a 64-bit ISA. If the array 220 includes 64-bit physical registers, then the access control logic 280 may prevent access to half of the particular physical register. For example, in one embodiment, the least-significant 32 bits of the particular physical register may be updated with write data on the lines 274 and 276. The most-significant 32 bits of the particular physical register may not be accessed. Therefore, the portion of the array 220 labeled "Second Portion" may be updated with the write data. The portion of the array 220 labeled "First Portion" may not be accessed. Separate wordlines may be routed to each of the first portion and the second portion. In other embodiments, a portion may be a different fraction of an entire width of a physical register than a half of the size. In addition, in other embodiments, the portion prevented from being accessed may be a least-significant portion, rather than a most-significant portion. In yet other embodiments, a portion prevented from being accessed may not occupy contiguous bit positions within a physical register.

Continuing with the above example, at a later time, the access control logic 280 may receive on line 282 a read register identifier identifying the same particular physical register in the array 220. This particular physical register may now be a source operand for an instruction with an operand size equal to the entire width of a physical register. For example, this particular physical register may be a destination operand for a 64-bit instruction. The access control logic 280 may receive on line 282 the indications of the particular physical register and the current instruction. In one embodiment, the least-significant 32 bits of the particular physical register may be read out on line 224. The read out logic 270 may receive this read out data on line 224. For example, read latches and/or flip-flop circuits and sense amplifiers may be used within the read out logic 270.

In addition, the most-significant 32 bits of the array 220 may be prevented from being accessed. Therefore, no valid read out data may be sent on line 222. Rather, the access control logic 280 may send a bypass numerical value on line 286 to the multiplexer circuit (MUX) 226. In one embodiment, the bypass numerical value is zero. The access control logic 280 may determine a select value for the select line for the mux 226. In this case, since the "First Portion" of the array 220 is not accessed, the bypass numerical value on line 286 may be selected to be placed on the output line 278. The read out logic 270 receives the value on line 278. The concatenation of the data on lines 278 and 224 may be output on line 272 as read out data.

The array 220 is typically implemented as an on-die static random access memory (RAM) with dedicated read and write ports. One implementation of the cell 230 is illustrated in FIG. 2. Typically, each of the decoders 212-216 includes a series of Boolean logic AND gates that drive appropriate word line logic within the wordline drivers 218. In the embodiment shown, the decoders 210 include a read decoder 212 and a write decoder 216. However, another number of read and write decodes may be chosen. In addition, the decoders may be interspersed within the array 220 with decoders being located closer to actual corresponding cells. For example, decoders may be assigned to the first portion or the second portion. Decoders for the second portion of the array 220 may be placed between the two portions within the array 220.

An example of the given cell 230 within the array 220 includes two read wordlines, which are wordline 0 on line 258 and wordline 1 on line 260. Additionally, the cell 230 includes two read ports, which are read port 0 on line 250 and read port 1 on line 252. Similarly, the cell 230 includes a single write wordline on line 256. In other embodiments, a different number of read decoders, read ports, write decoders and write wordlines may be used. As shown, the given cell 230 has back-to-back inverters 232 and 234 for storing information within the cell 230. The output of each of the inverters 232 and 234 may provide either the associated bit value for the cell or an inverted version of the bit value. A logic high value may be equivalent to the value of a power reference. A logic low value may be equivalent to the value of a ground reference.

During a write operation, the write wordline is asserted to a logic high value on line 256 for a particular row. The wordline drivers 218 assert the write wordline. Appropriate data values are placed on each of the write bit 0 on line 348 and the write bit 1 on line 254 by data driving circuitry in the block 270. These values cause one of the two nodes tied to the pair of inverters 232 and 234 to be discharged to a logic low value via either the transistor stack including nmos transistors 240 and 242 or the transistor stack including nmos transistors 244 and 246.

When a read operation is not handled by the access control logic 280, the circuitry within the components 210-270 is used. During such a read operation, one or both of the read wordlines on lines 258 and 260 are asserted to a logic high value. One or both of the nmos transistors 236 and 228 are turned on. Accordingly, the state stored by the pair of inverters 232 and 234 is provided to one or both of the read ports on lines 250 and 252. The values on the lines 250 and 252 are provided to the readout logic in the circuitry block 270. This readout logic may include one or more of latches, flip flops, and sense amplifiers. As can be seen from the block diagram and the circuit description for the physical register file 200, when the access control logic 280 is able to prevent access for particular portions of the array 220, the power consumption associated with the circuitry components 210-270 may be reduced. In addition, the latency for the read operation may be reduced.

Figure 3:
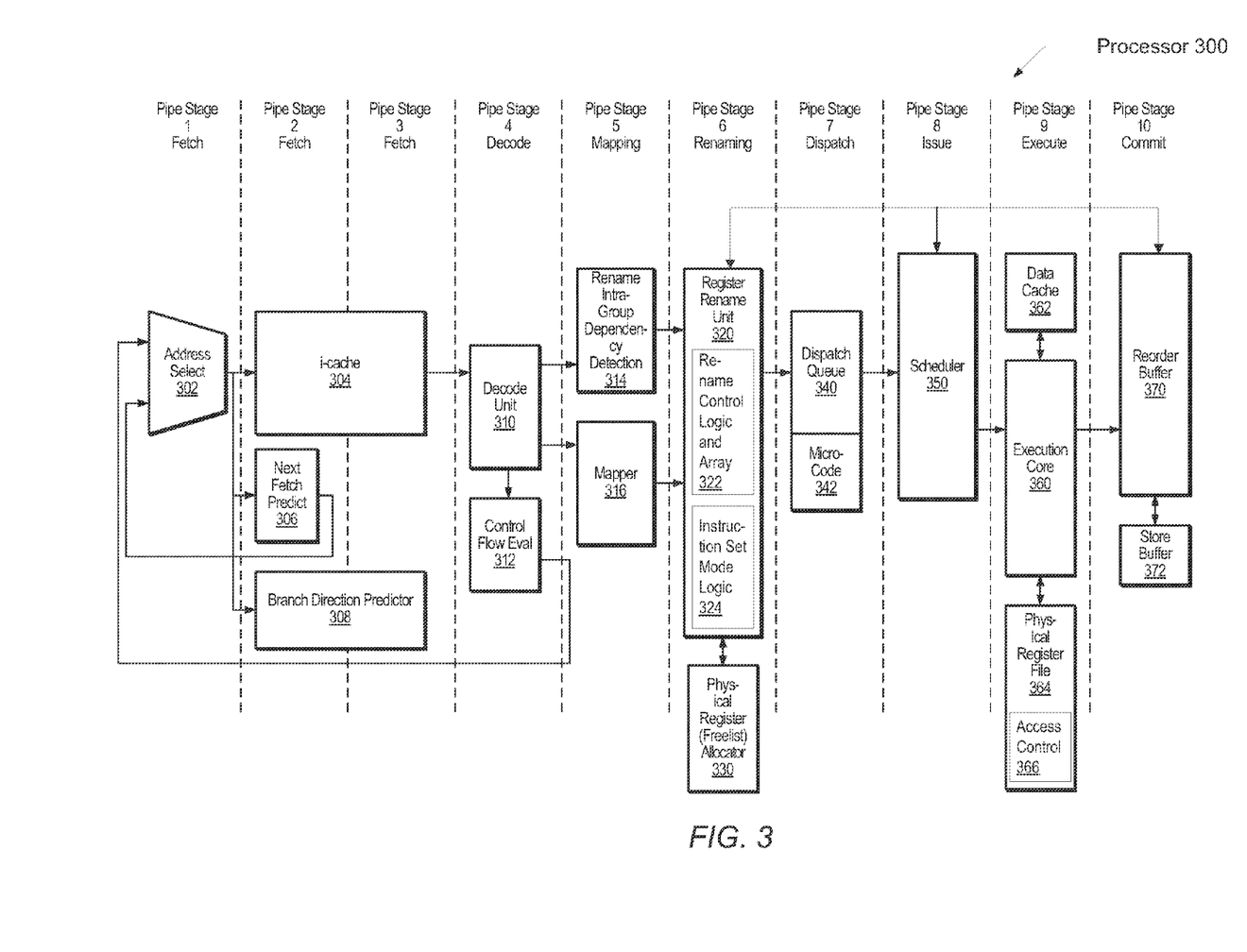
FIG. 3 is a generalized block diagram of one embodiment of a processor that performs superscalar, out-of-order execution with reduced power consumption register file accesses.

Referring to FIG. 3, a generalized block diagram illustrating one embodiment of a processor 300 that performs superscalar, out-of-order execution with reduced power consumption register file accesses is shown. The processor core 300 may utilize a multi-stage pipeline for processing of instructions. Although functional and control blocks are shown in a particular order and in a particular pipeline stage, other combinations are possible and contemplated. In addition, the functional and control blocks may occupy more than one pipeline stage. In most cases, a single pipeline stage is shown for each functional block for ease of illustration.

Instructions of a software application may be loaded into the i-cache 304 within the processor 300. The software application may have been stored in an external disk memory, external DRAM, and/or one of multiple peripheral devices. Generally speaking, when software programmers write applications to perform work according to an algorithm or a method, the programmers utilize variables to reference temporary and result data. This data and the code utilize space allocated in computer memory. The operating system allocates regions of memory for the software application.

During processing of the application, the data may be loaded from the allocated regions of memory into the data cache 362. Subsequently, one or more architectural registers within the physical register file 364 are used to load and store the temporary and result data. The architectural registers are architecturally visible. Therefore, a software programmer and/or a compiler may identify the architectural registers within the software application. The architectural registers are associated with a given instruction set architecture (ISA). The ARM instruction set architecture may be selected for the given ISA. Alternatively, the Thumb, Thumb-2, Alpha, PowerPC, SPARC, MIPS, x86, or any other ISA may be selected. The given ISA may be used to select a manner for declaring and allocating regions of memory. The given ISA may use instructions and operands with a size less than a size of the physical registers within the physical register file 364.

The software application may use instructions with two or more data types, each with an associated size and alignment. In one embodiment, each instruction includes a bit to indicate whether the instruction is associated with a data type size less than a width of a physical register within a physical register file. In one embodiment, an ISA supports 64-bit data operands, but multiple data types may use 32-bit operands. The hardware in the processor 300 may include circuitry for processing instruction extensions with a smaller data type size than a full width of a physical register. An example of mixed code with a 16-bit instruction set and a 32-bit instruction set is provided in the following:

```
ADR   r0, HalfProg + 1    // Generate branch target address
                          // and set bit [0], to arrive in half-width state
BX    r0                  // Branch exchange to half-width code
Code16                    // Subsequent instructions are half-width
                          // code.
MOV   r1, 0x7FB2          // Load register r1 with the
                          // hex value 0000 7FB2.
MOV   r2, 0xC8            // Load register r2 with the
                          // hex value 0000 00C8.
ADD   r1, r1, r2          // r1 = r1 + r2
ADR   r0, FullProg        // Generate branch target address
                          // and reset bit [0], to arrive in full-width
                          // state
BX    r0                  // Branch exchange to full-width code
Code32                    // Subsequent instructions are full-width
                          // code.
MOV   r3, 0x89D36B        // Load register r3 with the
                          // hex value 0089 D36B
MOV   r4, 0xA32E96C       // Load register r4 with the
                          // hex value 0A32 E96C
ADD   r3, r3, r4          // r3 = r3 + r4
SUB   r5, r4, r2          // r5 = r4 – r2 (mixed operands)
SUB   r4, r4, r1          // r4 = r4 – r1 (mixed operands)
ADD   r1, r4, r3          // r1 = r4 + r3 (r1 changes size type)
```

In the above examples, the destination operand is listed first followed by the source operand(s). However, the opposite convention is possible and contemplated. In addition, for the majority of the instructions, two source operands are listed. However, in cases that a particular architectural register is both a destination operand and a source operand, one source operand may be listed with the destination architectural register number implied as the second source operand. The designation "0x" is used to denote a hexadecimal value. For example, the value 0x7FB2 is a 16-bit hexadecimal value and the value 0xC8 is an 8-bit hexadecimal value. In the above examples, the intermediate value is shown as a numeral with no symbols besides a hexadecimal designation. In other cases, a symbol may accompany the numerical value. For example, in the ARM ISA, an intermediate value may use the prefix "#", such as "#0xC8" instead of "0xC8". The above instructions are meant to be a pseudocode example and language agnostic.

As seen from the above example code statements, a first region of the code is in a mode that uses instruction extensions with operands with a size half of an entire width of a physical register in a physical register file. In this example, an entire width is 32 bits and a half width is 16 bits. The register "r0" is used as a link register. When the least-significant bit 0 is set to a logic high value, the code is in the half-width instruction set mode. Later, the link register r0 is loaded with a branch target address with the least-significant bit 0 set to a logic low value to transition to a full-width instruction set mode.

The two subtraction instructions are in a code region with instructions that use source operands that were written in the half-width code region. In this case, a read of a physical register file may access only half of an associated physical register. A numerical value, such as zero, may be bypassed for the other half of the full-width value. An example of the half-width read access and bypassing of a numerical value is described earlier and shown in FIG. 2. In the above code example, the register r4 is a full-width source operand for the two subtraction instructions. The registers r2 and r1 are half-width source operands for the subtraction instructions. The register r1 transitions from a half-width operand to a full-width operand in the last addition instruction, since the register r1 is a destination operand in this last instruction.

Continuing with a description of the components of the process 300, one or more instructions of a software application may be fetched from the i-cache 304. The one or more instructions may be indicated by an address conveyed by address select logic 302. Multiple instructions may be fetched from the i-cache 304 per clock cycle if there are no i-cache misses. The address may be incremented by a next fetch predictor 306. A branch direction predictor 308 may be coupled to each of the next fetch predictor 306 and the control flow evaluation logic 312 in a later pipeline stage. The predictor 308 may predict information of instructions that change the flow of an instruction stream from executing a next sequential instruction.

The decode unit 310 decodes the opcodes of the multiple fetched instructions. Alternatively, the instructions may be divided into micro-instructions, or micro-ops. As used herein, the terms "instructions" and "micro-ops" are interchangeable as the invention may be used with an architecture that utilizes either implementation. In one embodiment, the control flow evaluation block 312 may alter fetch of instructions in the address selector 302. For example, an absolute address value associated with an unconditional branch opcode may be sent to the address selector 302.

Rename intra-group dependency detection logic 314 may find dependencies among instructions decoded by the decode unit 310. An intra-group of instructions may include decoded instructions from one or more clock cycles, or pipeline stages. Dependencies such as write-after-read (WAR), write-after-write (WAW) and read-after-write (RAW) may be detected. Dependency vectors that indicate dependencies between instructions may be generated. The mapper 316 may divide instructions among distributed hardware resources using factors such as available concurrency, criticality of dependence chains, and communication penalties.

In addition to out-of-order issue of instructions to execution units within a superscalar microarchitecture, the processor 300 may perform register renaming to increase throughput. The processor 300 may include a set of physical registers larger than a set of integer and floating-point architecturally visible registers, such as the physical register file 364. Using hardware, the processor 300 dynamically renames an architectural register identifier used for a source operand. Similarly, the hardware dynamically renames an architectural register identifier used for a destination operand. The renaming may occur after instruction decode.

When a source operand is renamed, a previously used physical register number may be mapped to the source operand if that mapping is still valid. Otherwise, a new physical register number from the free list allocator 330 may be mapped to the source operand. When a destination operand is renamed, a new physical register number from the free list allocator 330 may be used. In addition, an indication may be stored indicating whether the physical register identifier is associated with an operand size equal to or less than an entire width of a physical register. This indication may be stored in one or more of a reservation station, a mapping table, a reorder buffer, forwarding bypass logic, or otherwise. The stored indication may determine how much of the width of the physical register file is accessed during read and write operations. When an instruction commits, a physical register storing the instruction destination value becomes a candidate to return to a free list of rename register numbers within the free list allocator 330.

When the hardware renames an architectural register identifier with a physical register identifier, the hardware stores the mapping in a data structure, such as a mapping table. As used herein, an identifier for either an architectural register or a physical register may be a number. Other forms of identifiers may be used. The physical register identifier used to rename an architectural register identifier may also be referred to as a rename register identifier.

The register rename unit 320 may include rename control logic and array 322 and zero cycle initialization logic 324. The register rename unit 320 may determine which physical register identifiers to use to rename architectural register identifiers used in both destination and source operands within instructions. The register rename unit may select candidate physical register identifiers from the freelist allocator 330, a rename mapping table within the rename control logic 322, or the zero cycle initialization logic 324.

The register rename unit may determine a given instruction is associated with operand sizes equal to an entire width of a physical register in the physical register file. In addition, the register rename unit may determine a given instruction is associated with operand sizes less than an entire width of a physical register in the physical register file. This detection may be performed by logic within the decoder or another logic block as well.

After instructions have been decoded and renamed, associated entries may be allocated in the dispatch queue 340. Instructions and associated renamed identifiers, program counter (PC) values, dependency vectors, indications of being associated with a particular instruction set, markings for completion, and so forth may be sent to the dispatch queue 340 and later to the scheduler 350. Various exceptions may be detected, such as by the execution core 360. Examples include protection exceptions for memory accesses, no address translation, and so forth. The exceptions may cause a corresponding exception handling routine to be executed, such as by the microcode 342.

The scheduler 350 may schedule instructions for execution in the execution core 360. When operands are available and hardware resources are also available, an instruction may be issued out-of-order from the scheduler 350 to one of the functional units within the execution core 360. The scheduler 350 may read its source operands from the physical register file 364 after translating renamed identifiers with a mapping table or from operand bypass logic. The read operations may access the entire width or less than the entire width of associated physical registers based on stored indications indicating an instruction set used to update the associated physical registers. The source operands may be provided to the execution core 360.

The execution core 360 may include a load/store unit. The load/store unit may be connected to a data cache (not shown) and the store buffer 372 either directly or through the reorder buffer (rob) 370. The processor 300 may include a translation look-aside buffer (TLB) for each of the i-cache 304 and the data cache to avoid a cost of performing a full memory translation when performing a cache access. The store buffer 372 may store addresses corresponding to store instructions. The rob 370 may receive results from the execution core 360. In addition, results may be bypassed to previous pipeline stages for data forwarding to dependent instructions already in the pipeline. The rob 370 may ensure in-order commit and retirement of instructions.

Figure 4:
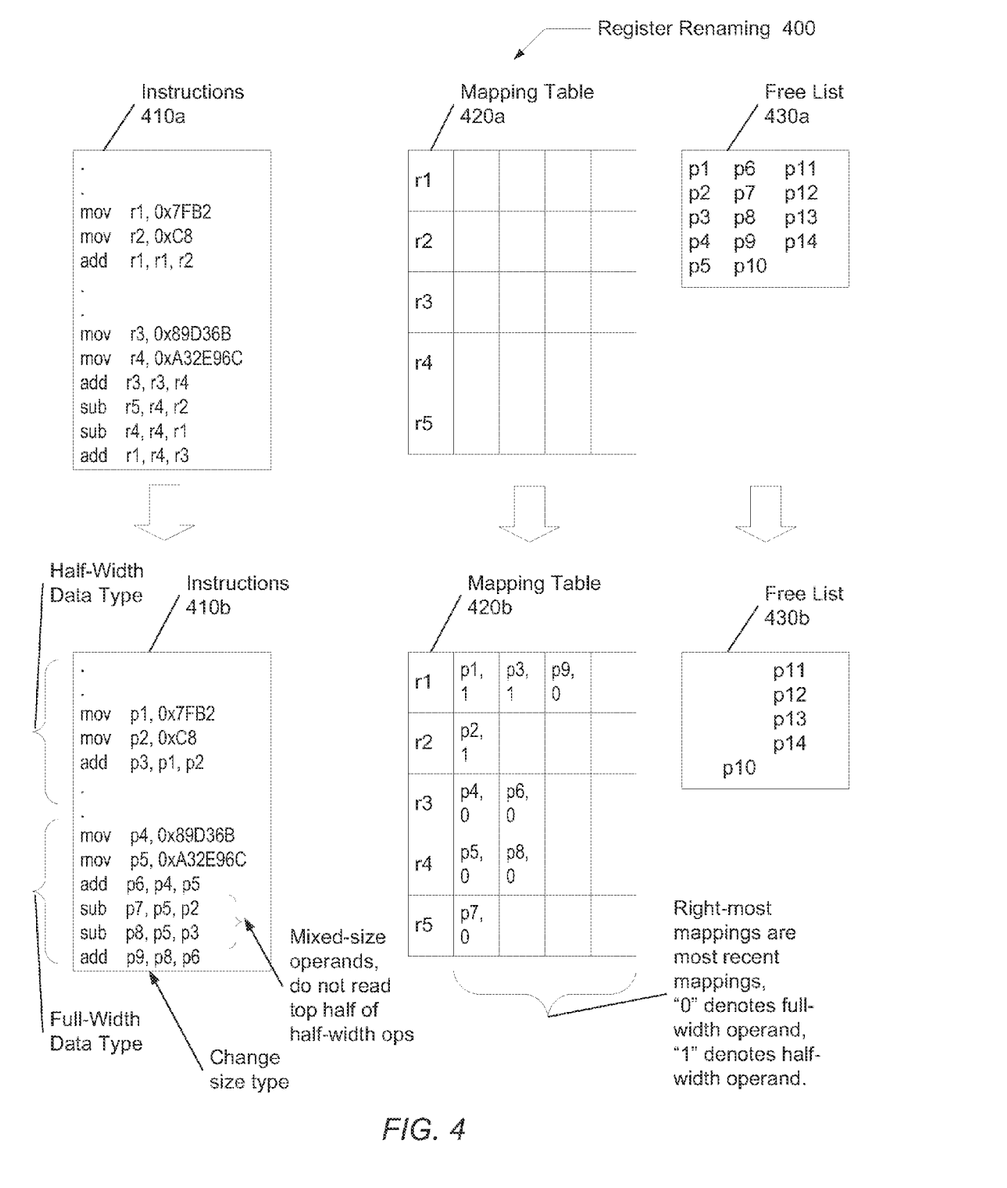
FIG. 4 is a generalized block diagram illustrating one embodiment of register renaming with reduced power consumption for register file accesses.

Turning now to FIG. 4, a generalized block diagram illustrating one embodiment of register renaming 400 with reduced power consumption register file accesses is shown. Segments from the above code example are included in the instructions 410a. In this example, a destination operand is listed first after an instruction mnemonic followed by one or more source operands. Registers use the general nomenclature of "r" followed by a register identifier. For example, register 1 is denoted by "r1". The branches and address loading instructions are removed for ease of illustration.

The instructions 410a include non-full-width instructions at the top. They include the two move instructions and an addition instruction. The full-width instructions are included at the bottom. They include two instructions each of move, addition and subtraction types. Similar to the above code example, 16-bit and 32-bit width instruction sets may be chosen for an example illustration. Other bit widths are possible and contemplated. The instructions 410a are meant to be a pseudocode example and language agnostic.

The instructions 410a utilize five architectural registers labeled r1-r5. These physical register identifiers are associated with actual physical registers. The mapping table 420a generally shows a data structure for storing mappings between architectural register identifiers and physical register identifiers.

The free list 430a shows a data structure for indicating the non-architectural physical register numbers available for renaming purposes. These physical register identifiers are also associated with actual physical registers. In this example, there are 14 physical register names using the general nomenclature of "p" followed by a register identifier. The free list 430a shows each one of the physical registers p1-p14 is available for register renaming.

Referring to the instructions 410b, these instructions are the same as the instructions 410a, however, register renaming has occurred for each of the instructions. The renaming process may rename one or more instructions in a given pipeline stage. Any number of instructions per pipeline stage may be chosen for simultaneous processing. The mapping table 420b stores the mappings for each of the instructions. The mapping table 420b shows the stored mappings between architectural register identifiers and physical register identifiers for each of the instructions. The free list 430b shows each of the physical registers p10-p14 is still available after each one of the instructions 410b has been renamed. Each of the physical registers p1-p9 has been used to rename architectural registers r1-r5 in the instructions 410b.

The mapping table 420b additionally shows a stored indication for each physical register identifier. This stored indication indicates whether a corresponding stored value is associated with a non-full-width operand size. For example, the physical register identifiers p1-p3 are assigned to destination operands that are non-full-width operands. In this example, a stored set bit ("1") indicates the non-full-width data type size. Here, this indication is shown stored in the mapping table 420b. However, this indication may be stored in a reservation station, a reorder buffer, bypass forwarding logic, or other locations. When the indication is set to a given value ("1" in this example), less than an entire width of the physical registers associated with the identifiers p1-p3 may be accessed during write operations. In this example, half of the width of these physical registers may be accessed.

The physical register identifiers p4-p9 are assigned to destination operands when an instruction is associated with a full-width operand size. In this example, a stored bit with a logic low value indicates the full width data type size. The two move instructions and the first addition instruction use the identifiers p4-p6 for respective destination operands. An entire width of physical registers associated with the identifiers p4-p6 may be accessed during write operations. In addition, the identifiers p4 and p5 are used as source operands for the addition instruction. An entire width of physical registers associated with the identifiers p4 and p5 may be accessed during read operations. Alternatively, the numerical values associated with identifiers p4 and p5 may be read from bypass forwarding logic.

The first subtraction instruction uses the physical register identifier p2 as a source operand. Since the p2 physical register identifier has a logic high indication, less than an entire width of the physical register associated with p2 is accessed during a read operation. Similarly, the second subtraction instruction uses the physical register identifier p3 as a source operand. Since the p3 physical register identifier has a logic high indication, less than an entire width of the physical register associated with p3 is accessed during a read operation. When the architectural register r1 has its physical register identifier updated from p3 to p9 due to the last addition instruction, the stored indication changes from a non-full-width indication to a full-width indication.

Figure 5:
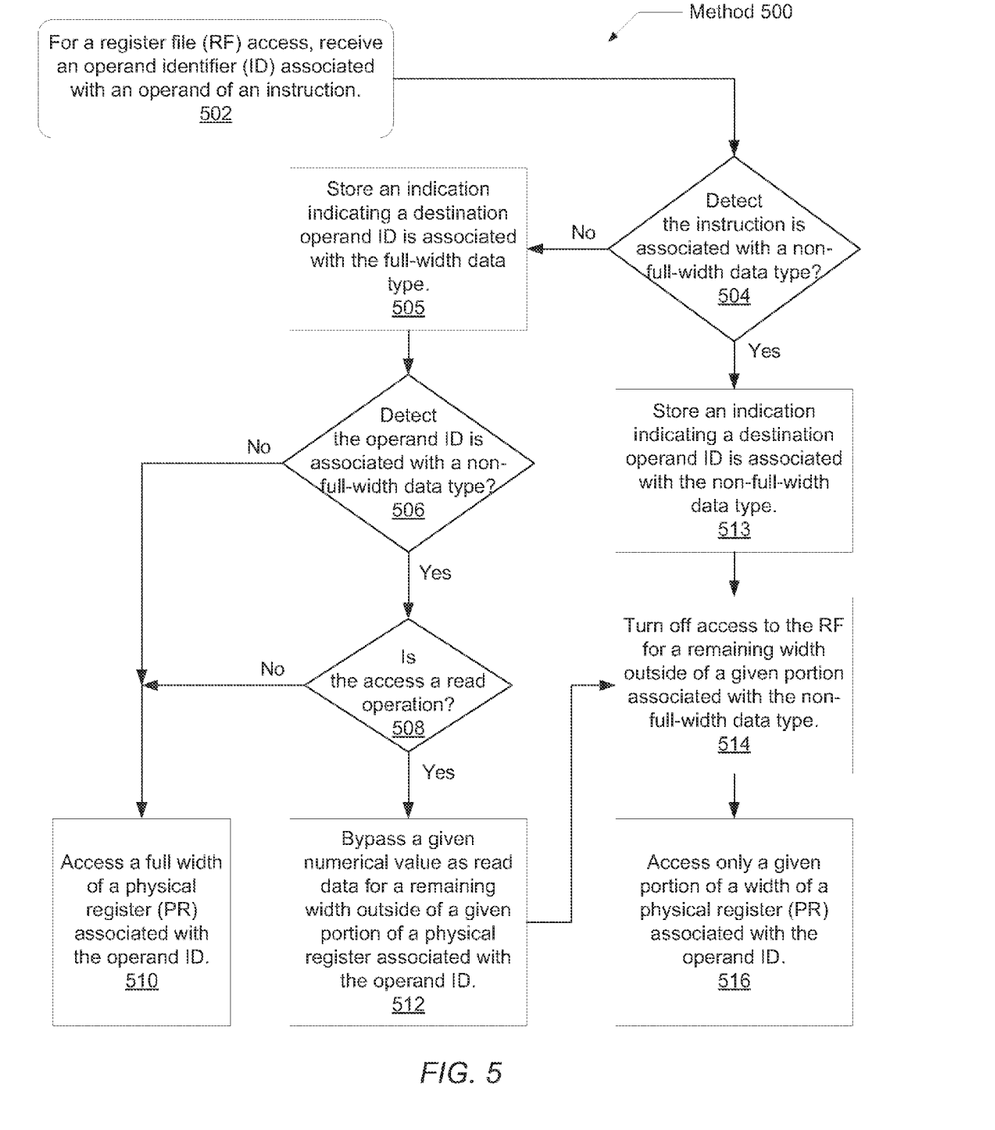
FIG. 5 is a generalized flow diagram illustrating one embodiment of a method for distinguishing different data type sizes for data operands and reducing the power consumption of register file accesses.

Referring now to FIG. 5, a generalized flow diagram of one embodiment of a method 500 for distinguishing different data type sizes for data operands and reducing the power consumption of register file accesses is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

Program instructions may be compiled, fetched from memory, decoded and executed. After decoding, the destination architectural register identifier of a given instruction may be renamed with a physical register (PR) identifier (ID) within the free list. While an instruction set architecture (ISA) may support multiple sizes for data types, a significant number of register file accesses may correspond to a data type size less than a width of a physical register within the register file. Therefore, steps may be taken to reduce the power consumption for these types of register file accesses.

In one embodiment, each instruction includes a bit to indicate whether the instruction is associated with a data type size less than a width of a physical register within the register file. In one embodiment, an ISA supports 64-bit data operands. However, many data types may have a size smaller than 64 bits, for example 32 bits. In another embodiment, the ISA may support extension instructions associated with a data type size less than a width of a physical register within the register file. For example, the ARM ISA supports the Thumb extension instructions. A mode set by code within a program may determine whether the Thumb instructions are being processed. In various embodiments, a programmer may explicitly declare particular data type or operands to have a size smaller than a register in order to prevent accesses to some portion of a register file as discussed herein. Additionally, or alternatively, a compiler may be configured to establish sizes for various data types that is smaller than might otherwise be the case. All such embodiments are contemplated.

For a register file access, in block 502, an operand identifier (ID) for a current instruction being processed is received. In one embodiment, a bit within the instruction indicates whether the instruction is associated with a data type size less than a width of a physical register within the register file. A stored indication may also be received which provides an indication as to a size of data stored in the register. In one embodiment, this stored indication may be located in the register rename unit. In various embodiments, the data operand identifiers are renamed to physical register (PR) numbers.

In such a case, the indication may be associated with a given physical register number and stored with a mapping in the register rename unit, a reservation station, or another unit.

If the instruction is associated with a non-full-width data type (conditional block 504), then in block 513, the processor may store an indication indicating the PR ID is used for a data operand associated with the non-full-width data type. In one example, the indication may indicate the PR ID is used for a 32-bit data operand, rather than a 64-bit data operand. In another example, the indication may indicate the PR ID is used for a 16-bit data operand, rather than a 32-bit data operand. Other examples and data type sizes are possible and contemplated. In one embodiment, this indication is stored along with the PR ID in the register renamer unit. In other embodiments, this indication may be stored in another unit within the processor.

In block 514, a remaining width of the register file outside of a given portion associated with the non-full-width data type is turned off for access. In one embodiment, the register file may process multiple accesses simultaneously in a given pipe stage. Each of these accesses may correspond to the non-full-width data type in order for the given portion to be turned off for the entire register file. For example, if the register file includes multiple 64-bit physical registers and a bit within the instruction indicates the instruction is a 32-bit instruction, then a most-significant half of the register file may be turned off for access. The least-significant half, or 32 bits, may be turned on, or enabled, for access. In one embodiment, only associated physical registers within the register file have a first portion turned off for access. In other embodiments, the first portion of the entire register file is turned off for greater power savings.

In block 516, only a given portion of a width of a physical register (PR) associated with the operand ID may be accessed. For example, the least-significant half of the physical register may be accessed by a read or a write operation. In one embodiment, the remaining pipe stages also turn off the most-significant half of the physical register width in order to reduce power consumption. In other embodiments, the remaining width may be another portion of the physical register width. Additionally, the remaining width may be another portion of the physical register width other than a most-significant or a least-significant portion.

If the instruction is not associated with a non-full-width data type (conditional block 504), then in block 505, the processor may store an indication indicating the PR ID is used for a data operand associated with the full-width data type. If the operand ID is not associated with a non-full-width data type (conditional block 506), then in block 510, a full width of a physical register (PR) associated with the operand ID is accessed by a read or a write operation. Using the earlier example of a 64-bit programming data model, both the instruction and the data operand (or physical register number if renaming is used) may be associated with a full width of a physical register within the register file. Therefore, all 64 bits of the physical register corresponding to the operand ID is accessed.

If the instruction is not associated with a non-full-width data type (conditional block 504), but the operand ID is associated with a non-full-width data type (conditional block 506), then access of the associated physical register may depend on the access type. If the access type is a write operation (conditional block 508), then control flow of method 600 moves to block 510. If the access type is a read operation, then in block 512, a given numerical value may be used to bypass and replace a remaining width of the physical register outside of a given portion of the physical register associated with the operand ID. The data that is read out from the given portion of the physical register may be concatenated with the bypass numerical value. In one embodiment, the bypass of this value may be performed by circuitry as shown in FIG. 2. By not reading the full width of the associated physical register, power consumption may be reduced for the access. Control flow of method 600 may move to blocks 514 and 516 to obtain the read data while reducing power consumption for the access.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
a physical register file comprising a plurality of physical registers configured to store data associated with a plurality of data types corresponding to at least two different sizes; and
control circuitry;
wherein the control circuitry is configured to:
store an indication of a mode of at least two modes in a register;
access said register to detect the mode of at least two modes that indicates whether instructions corresponding to a first instruction set architecture (ISA) are being processed or instructions corresponding to a second ISA different from the first ISA are being processed, wherein the first ISA does not support data operands with a size equal to a full size of a register of the plurality of registers and the second ISA does support data operands with a size equal to the full size of a register of the plurality of registers;
in response to detecting a first mode of the at least two modes, determine a first instruction is associated with the first ISA, allow access to a first portion of a given register of the plurality of physical registers identified by the first instruction and prevent access to a second portion of the given register;
in response to detecting a second mode of the at least two modes, determine the first instruction is associated with the second ISA and allow access to the full size of the given register; and
in response to detecting the first mode and the given register is a destination register for the first instruction, store a first indication corresponding to the given register that indicates the given register is being used to store a data operand associated with the first ISA.

2. The processor as recited in claim 1, wherein in response to detecting the second mode and the given register is a destination register for the first instruction, the control circuitry is further configured to store a second indication corresponding to the given register which indicates the given register is being used to store a data operand associated with the second ISA.

3. The processor as recited in claim 1, wherein to detect whether the first instruction is associated with the first mode or the second mode, the control circuitry is further configured to access a link register storing a return address used after a call in program code, wherein an indication of the first mode or the second mode is included in the return address.

4. The processor as recited in claim 1, wherein in response to detecting a read of the given register while in the second mode for a source operand with a size greater than the first portion, the control circuitry is further configured to return both a data operand stored in the first portion of the given register and a predetermined value for a portion of the given register not used to store the data operand.

5. The processor as recited in claim 4, wherein the predetermined value is one or more bits set equal to zero.

6. The processor as recited in claim 2, wherein the processor further comprises a reservation station configured to store the first indication and the second indication.

7. The processor as recited in claim 1, wherein when the first instruction corresponds to the first ISA, the data operand has a size equal to half the given register.

8. A method comprising:
storing data associated with a plurality of data types in a physical register file comprising a plurality of physical registers, said data types corresponding to at least two different sizes;
storing an indication of a mode of at least two modes in a register;
accessing said register to detect the mode of at least two modes that indicates whether instructions corresponding to a first instruction set architecture (ISA) are being processed or instructions corresponding to a second ISA different from the first ISA are being processed, wherein the first ISA does not support data operands with a size equal to a full size of a register of the plurality of registers and the second ISA does support data operands with a size equal to the full size of a register of the plurality of registers;
in response to detecting a first mode of the at least two modes, determining a first instruction is associated with the first ISA, allowing access to a first portion of a given register of the plurality of physical registers identified by the first instruction and preventing access to a second portion of the given register;
in response to detecting a second mode of the at least two modes, determining the first instruction is associated with the second ISA and allowing access to the full size of the given register; and
in response to detecting the first mode and the given register is a destination register for the first instruction, storing a first indication corresponding to the given register that indicates the given register is being used to store a data operand associated with the first ISA.

9. The method as recited in claim 8, wherein in response to detecting the second mode and the given register is a destination register for the first instruction, the method further comprises storing a second indication corresponding to the given register which indicates the given register is being used to store a data operand associated with the second ISA.

10. The method as recited in claim 8, wherein detecting whether the first instruction is associated with the first mode or the second mode comprises accessing a link register storing a return address used after a call in program code, wherein an indication of the first mode or the second mode is included in the return address.

11. The method as recited in claim 8, wherein in response to detecting a read of the given register for a source operand with a size greater than the data operand stored in the given register, the method comprises returning both the data operand and a predetermined value for a portion of the given register not used to store the data operand.

12. The method as recited in claim 11, the predetermined value is one or more bits set equal to zero.

13. The method as recited in claim 8, wherein the first portion is half of the given one of the plurality of physical registers.

14. A physical register file comprising:
an array comprising a plurality of physical registers;
an interface configured to receive array access requests; and
access control logic; and
wherein the access control logic is configured to:
   store an indication of a mode of at least two modes in a register;
   access said register to detect whether an instruction accessing the register file in a given clock cycle is associated with a first mode of the at least two modes rather than a second mode different from the first mode, wherein the first mode corresponds to a first instruction set architecture (ISA) that does not support data operands with a size equal to a full size of a register of the plurality of registers and the second ISA does support data operands with a size equal to the full size of a register of the plurality of registers;
   in response to detecting each instruction accessing the register file in the given clock cycle is associated with the first mode, prevent access to a first portion in each register of the plurality of physical registers; and
   in response to detecting each instruction accessing the register file in the given clock cycle is associated with the second mode, allow access a full register of each register of the plurality of physical registers; and
   in response to detecting each instruction accessing the register file in the given clock cycle is associated with the first mode, store a first indication corresponding to destination registers for each instruction that indicates the destination registers are being used to store data operands associated with the first ISA.

15. The physical register file as recited in claim 14, wherein in response to detecting each instruction accessing the register file in the given clock cycle is associated with the second mode, the access control logic is further configured to store a second indication corresponding to destination registers for said each instruction which indicates the destination registers are being used to store data operands associated with the second ISA.

16. The physical register file as recited in claim 15, wherein in response to detecting a second instruction uses a data size equal to a full size of given one of the plurality of physical registers and a source operand of the second instruction has an associated indication indicating a first portion of the source operand is inaccessible, the access control logic is further configured to output a given numerical value for the first portion without accessing the first portion.

17. The physical register file as recited in claim 16, wherein the first portion is half of a physical register.

18. An apparatus comprising:
control logic; and
a physical register file including a plurality of physical registers; and
wherein the control logic is configured to:
   store an indication of a mode of at least two modes in a register;
   access said register to detect whether an instruction accessing the register file in a given clock cycle is associated with a first mode of the at least two modes rather than a second mode different from the first mode, wherein the first mode corresponds to a first instruction set architecture (ISA) that does not support data operands with a size equal to a full size of a register of the plurality of registers and the second ISA does support data operands with a size equal to the full size of a register of the plurality of registers;
   in response to detecting the instruction is associated with the first mode:
      prevent a read access to a first portion of a register of the plurality of physical registers responsive to detecting an access is a read operation; and
      prevent an update of the first portion of the register of the plurality of physical registers responsive to detecting an access is a write operation; and
   in response to detecting the instruction is associated with the second mode, allow access of to a full size of the register of the plurality of physical registers; and
   in response to detecting the instruction is associated with the first mode, store a first indication corresponding to a destination register of the instruction that indicates the destination register is being used to store a data operand associated with the first ISA.

19. The apparatus as recited in claim 18, wherein in response to detecting a given instruction uses a data size equal to a full size of a given register of the plurality of physical registers and a source operand of the given instruction has an associated indication indicating a first portion of the source operand is inaccessible, the control logic is configured to output a given numerical value for the first portion without accessing the first portion.

* * * * *

UNITED STATES PATENT AND TRADEMARK OFFICE
CERTIFICATE OF CORRECTION

PATENT NO. : 9,317,285 B2  
APPLICATION NO. : 13/460178  
DATED : April 19, 2016  
INVENTOR(S) : Gupta et al.

Page 1 of 1

It is certified that error appears in the above-identified patent and that said Letters Patent is hereby corrected as shown below:

In the Claims:

Column 19, Claim 14, Line 22, please delete "registers; and" and substitute -- registers; --.

Column 19, Claim 14, Line 25, please delete "a full register" and substitute -- to a full size --.

Column 20, Claim 18, Line 31, please delete "access of to a" and substitute -- access to a --.

Signed and Sealed this
Twelfth Day of July, 2016

Michelle K. Lee
*Director of the United States Patent and Trademark Office*